3,105,062
METHOD OF MAKING SHAPED POLYURETHANE
ELASTOMER
George T. E. Graham, Wayne, and Robert A. Gregg, Passaic, N.J., assignors to United States Rubber Company, New York, N.Y., a corporation of New Jersey
No Drawing. Filed Aug. 18, 1958, Ser. No. 755,380
1 Claim. (Cl. 260—75)

This invention relates to a new method of making shaped or coated products from diisocyanate modified polyesters. This invention also relates to certain new shaped elastomers that have heretofore been unobtainable.

In the method of this invention, appropriate diamines in the solid state are mixed with polyester-diisocyanate or polyether-diisocyanate prepolymer at temperatures below the melting point of the diamine so as to obtain a two-phase system of dispersed diamine in the diisocyanate modified intermediate. This two-phase system may at times appear to the naked eye to be homogeneous. The two-phase mixture is characterized by its remaining stable for considerable lengths of time so as to allow shaping or coating operations to be performed thereon. Cure is accomplished by raising the temperature to conventional curing temperature and maintaining for a short time.

The use of diamines as curing agents for the reaction products of polyesters and polyethers with diisocyanates is well known to the art. The general procedure is to prereact the polyester and the diisocyanate and then add the diamine at a temperature above its melting point under such conditions as to obtain a homogeneous liquid which is then cast into a mold and heated to cause solidification. Alternatively, as in U.S. Patent 2,721,811, the polyester-diisocyanate is shaped and then the diamine applied followed by heat to cure.

Representative of the prior practice is U.S. Patent 2,620,516 to Müller of Farbenfabriken Bayer. He speaks of using a fast reacting diamine with a slow reacting diisocyanate and vice versa. He is limited to certain reactant pairs as determined by his test. In addition, he requires a cure time of some 4–5 hours (col. 3, lines 32–35) while the present invention utilizes a normal cure of some 20–45 minutes. Müller's examples show a cure time ranging from 5–15 hours. Although no indication is given by Müller of pot life, it is known to be under 10 minutes and by experiment it has been found to be from 1 to 5 minutes for certain combinations listed by Müller.

An advantage of the instant invention over Müller's is that additional combinations of diisocyanates and diamines may be employed. Müller's criterion for determining which diamine can be used with which diisocyanate depends upon the speed of reaction of the particular pair of components in boiling methylene chloride. If a turbidity occurs within 25–30 seconds, Müller states that the particular system is inoperable. In the instant invention, there is no such limitation. Any diisocyanate and any solid diamine may be combined whether or not turbidity is achieved in boiling methylene chlorde. This is illustrated by Example V below wherein turbidity was achieved and by Example IX below wherein turbidity was not achieved according to the test set forth by Müller.

A further advantage of the instant invention over Müller, taken as fairly representing the prior art, is the fact that in addition to greatly increased pot life, there is a greatly decreased time required for curing.

Under conventional processes, the utmost care must be employed in order to prevent premature solidification and hence non-uniformity of the final product once the diamine is added, since the solidification reaction is extremely rapid. Where diamines are not used as curing agents, but instead, water or excess diisocyanate is employed, the crosslinking reaction proceeds very slowly at moderate temperatures so that the product may be shaped while in the form of a semi-solid or paste and may even be stored in this condition for some length of time prior to use. Such is decidedly not the case when a diamine is used as the curing agent. Conventionally, the reaction product must be shaped just as soon as the diamine is added since solidification occurs almost immediately.

It has been found by the present inventors that when the diamine is added to the prepolymer and maintained as a solid by mixing it below its melting point, a two-phase dispersion, which may either be paste-like or a visually homogeneous liquid is obtained and the mixture may be handled without undue rapidity. This two-phase mixture may be stored for several hours or longer under appropriate conditions without danger of crosslinking.

As can be readily understood, it is far more desirable to use a paste-like mixture than a liquid when coating textiles or molding such items as tire treads. Any large scale operation requiring the employment of large quantities of materials cannot readily be adapted to use the conventional liquid diamine systems. It is essential in these operations that a large quantity of mix be prepared at one time but this cannot be done unless the mix will be reasonably stable for some time. Here, the mixtures of this invention, due to their greatly extended pot life, are quite satisfactory.

The two-phase mixture is obtained by first reacting the polyester or polyether with the diisocyanate as per standard procedures and thereby obtaining a liquid mixture. To this is added a diamine in solid form. The diamine added must be so selected that its melting point is at a higher temperature than the temperature of the mixture. The diamine must be added below its melting point. It is preferred that addition be at temperatures below 100° C. Excellent products are obtained when mixing is at room temperature. The mixture is agitated and a two-phase system results. Due to the very slight solubility to the diamine in the mixture, there is often a slight reaction occurring leading to a thickening of the mixture and the formation of a paste-like composition. In some cases this thickening does not occur and a visually homogeneous dispersion is achieved which is as stable as the paste. After the mixture has been shaped as desired, the temperature is then raised to a conventional rubber curing temperature usually in the range of 100 to 170° C. thereby causing very rapid crosslinking to begin. The product, to insure uniformity, is generally maintained at the elevated temperature for some 20–45 minutes.

The diamine employed must be a crystalline primary diamine, either aromatic or aliphtic. The sole limitation thereon being that its melting point must be above the temperature at which it is to be mixed with the liquid prepolymer.

There is no critical limitation on the temperature at which the solid diamine is added to the liquid prepolymer other than:

A. The temperature of the prepolymer prior to addition must not be above the decomposition temperature of said prepolymer, and B. The temperature of the prepolymer prior to diamine addition must be below the melting point of the solid diamine.

Good final products are obtained if the above two conditions are met regardless of whether or not a prior Müller test gives a positive or negative result when the diisocyanate and the diamine are allowed to react in a solution of boiling methylene chloride for 25 seconds.

It is noted that both naphthalene diamine and benzidine, inoperable under Müller's method give very satisfactory final products through this invention.

A few applicable diamines include:

| Diamine— | Melting point, °C. |
|---|---|
| Naphthalene diamine | 189 |
| 2,2'-diaminodiphenylmethane | 81 |
| Benzidine | 128 |
| 4,4'-diaminodiphenyl ether | 186 |
| 2,4-diaminotoluene | 99 |
| 1,4-diaminobenzene | 140 |
| Diaminoanisole (1,2,4) | 68 |
| Dianisidine | 131 |
| Dichlorobenzidine | 131 |
| O-tolidine | 129 |
| 3,3'-dichloro-4,4'-diaminodiphenylmethane | 110 |

Any polyester, polyether, or polyester amide may be employed. A full discussion of such compounds appears in copending application Serial Number 604,083, filed August 15, 1956, Kienle. Any diisocyanate may be employed, also in accordance with the aforesaid application. The method of forming the liquid prepolymer is believed to be well known to the art and thus not included within the scope of this invention.

It is to be noted that it is well known in the science of chemistry that the rate of a chemical reaction can be decreased by lowering the temperature at which the reaction is taking place. This invention however is not dependent upon this principle. First, this is so because solid diamines have not heretofore been successfully used in forming shaped polyurethane elastomers and second, it will be noted that in Example IV when all of the reactants were added at once, at a temperature well below the diamine melting point no satisfactory sample was obtainable. Further, in Example VI, the diamine was added to the prepolymer at room temperature as a solution in dioxane, a common solvent, and satisfactory results were not achieved.

Further details may be obtained by reference to the following examples:

EXAMPLE I

One mole (1920 grams) of a polyester with an acid number below 1 made from adipic and a 70:30 mixture of ethylene and propylene glycols was reacted with two moles (348 grams) of toluene 2,4-diisocyanate for one hour at 85° C. to form the polyester-diisocyanate prepolymer. Naphthalene-1,5-diamine to the extent of 4.9 parts diamine per 100 parts prepolymer by weight (111 grams diamine) was then added at room temperature in a Braebender plastograph. The resulting mixture was a two-phase system. Mixing was contained for 15–20 minutes at which time the material was stiff and putty-like. Samples were compression molded between polytetrafluoroethylene-coated plates, cured for 30 minutes at 140° C. and then stored for 7 days at 65% relative humidity and 70° F.

It was observed that there were a number of tiny particles in the final product thought due to impurities in the diamine used but in spite of them, the samples showed exceptional modulus, tear resistance and tensile strength. It was noted that when mixing was done on a 3 roll paint mill there were very few of these tiny particles visible.

EXAMPLE II

Procedure as above in Example I except that the diamine ratio was varied from 0.5 to 1.2 moles of diamine per mole of polyester-diisocyanate intermediate. It was indicated that the optimum ratio was about 0.5 to 0.8. The results are tabulated below in Table I.

EXAMPLE III

Procedure as above in Example I except that curing conditions were varied between 100° C. and 160° C. from 5 minutes to 17 hours. It is thought that the best conditions were achieved at 160° C. for 30 minutes. The results are tabulated in Table I.

EXAMPLE IV

A one-stage process, in which polyester, diisocyanate, and diamine are mixed together simultaneously has certain inherent advantages and was tried for the present system. All of the materials of Example I were mixed together simultaneously at 85° C. but no satisfactory sample was obtainable.

EXAMPLE V

One mole of a polyester of 1860 molecular weight, made from adipic acid and a 70:30 mixture of ethyelne and propylene glycols, was reacted with two moles of diphenylmethane diisocyanate for one hour at 85° C. Varying amounts of p,p'-diaminodiphenylmethane were then added on a 3 roll paint mill at room temperature, the resulting products being substantially visually homogeneous when compression molded and cured as per Example I. Various curing conditions were tried. Data are tabulated in Table II.

p,p'-Diaminodiphenylmethane and diphenylmethane diisocyanate were reacted in boiling methylene chloride in semimolar concentration. Turbidity occurred in less than 5 seconds.

EXAMPLE VI

Same procedure as in Example V except that the diamine was added at room temperature as a 26% solution (based on weight) in dioxane. The reaction was so rapid that the mix was solid in less than one minute. Also, vulcanizates made by this method were generally of poor quality.

EXAMPLE VII

Same procedure as in Example V except that a conventional rubber mill was employed in the mixing stage. Although the final product was not as visually homogeneous as in Example V, modulus, tear resistance, and torsional hysteresis properties were comparable.

EXAMPLE VIII 16.02 parts by weight of polyester-diisocyanate adduct (1 mole of 70:30 ethylene propylene adipate reacted with 2.2 moles toluene diisocyanate) of molecular weight 1940 was charged to an aluminum vessel and heated to 137° C. with agitation. 1.41 parts dianisidine (M.P. 131° C.) were added all at once and vigorously agitated with no additional heating. In 30 seconds, the mixture was so stiff it had to be scraped into a frame mole. It was cured under high pressure for 20 minutes at 140° C. The final material had good physical properties over small areas but was non-homogeneous and exhibited many fold-ins and irregularities because of the molding of an already gelled material. Some parts of the product were softer than others as well.

Table I
COMPLETE TABULATION OF DATA

| Run No | B126 | B184 | B186 | B187 | B188 | B190 | B191 | B192 | B193 | B194 | B195 | B196 | B199 | B200 |
|---|---|---|---|---|---|---|---|---|---|---|---|---|---|---|
| Naphthalene-1,5-diamine/PDI ratio | 0.7 | 0.5 | 0.7 | 0.7 | 0.7 | 0.7 | 0.7 | 0.7 | 0.6 | 0.6 | 0.7 | 0.6 | 0.9 | 1.2 |
| Cure: | | | | | | | | | | | | | | |
| Time, min | 30 | 30 | 30 | 15 | 5 | 30 | 30 | 5 | 17 hr | 30 | 30 | 30 | 30 | 30 |
| Temp., °C | 160 | 140 | 160 | 160 | 160 | 120 | 100 | 100 | 140 | 140 | 140 | 160 | 140 | 140 |
| Autographic S.S. (0 days): | | | | | | | | | | | | | | |
| 100% elong., p.s.i | | | | 500 | 530 | | | | 525 | | 540 | 365 | 890 | 855 |
| 200% elong., p.s.i | | | | 625 | | | | | 690 | | | | 1,095 | 955 |
| 300% elong., p.s.i | | | | | | | | | 860 | | | | 1,320 | |
| Tensile, p.s.i | | | | 660 | 530 | | 210 | 295 | 2,135 | 340 | 590 | 400 | 2,640 | 970 |
| Elong. at break, percent | | | | 258 | 104 | | 12 | 32 | 678 | 78 | 158 | 160 | 621 | 250 |
| Autographic S.S. (7 days): | | | | | | | | | | | | | | |
| 100% elong., p.s.i | 820 | 640 | 865 | 775 | 825 | 815 | 825 | 795 | 745 | 720 | 800 | 690 | 935 | 860 |
| 200% elong., p.s.i | 1,065 | 855 | 1,110 | 1,040 | 1,060 | 1,050 | 1,035 | 995 | 1,010 | 945 | 1,050 | 925 | 1,165 | |
| 300% elong., p.s.i | 1,465 | 1,160 | 1,460 | 1,390 | 1,425 | 1,390 | 1,360 | 1,290 | 1,465 | 1,295 | 1,415 | 1,295 | 1,490 | |
| Tensile, p.s.i | 4,125 | 3,790 | 3,800 | 3,860 | 3,445 | 3,545 | 3,485 | 3,360 | 3,935 | 3,615 | 3,970 | 3,830 | 3,245 | 1,025 |
| Elong. at break, percent | 566 | 616 | 586 | 580 | 560 | 592 | 590 | 612 | 519 | 572 | 591 | 581 | 555 | 196 |
| Scott test: | | | | | | | | | | | | | | |
| Tensile, p.s.i | 6,680 | 4,090 | 6,340 | 5,130 | 4,400 | 4,500 | 3,790 | 3,610 | 5,440 | 4,500 | 4,735 | 4,930 | 3,350 | 955 |
| Elong., percent | 680 | 720 | 720 | 730 | 680 | 700 | 720 | 730 | 630 | 690 | 680 | 670 | 610 | 190 |
| Set | .12 | .19 | .22 | .17 | .21 | .24 | .30 | .33 | .13 | .21 | .21 | .18 | .26 | .08 |
| Tors. hysteresis, R.T. | .097 | .113 | .126 | .118 | .099 | .112 | .153 | .169 | .112 | .140 | .119 | .138 | .140 | .165 |
| Tear test, lb./.1 inch | 34 | 35 | 42 | 41 | 43 | 43 | 49 | 53 | 20 | 31 | 35 | 27 | 44 | 16 |
| Swelling index (dimethylformamide) | 8.8 | 7.8 | 12.1 | 9.1 | 10.4 | 13.8 | 27 | 42 | 5.2 | 7.0 | 7.3 | 6.7 | 12.2 | ∞ |
| Durometer | | 75 | 81 | 80 | 80 | 82 | 84 | 82 | 79 | 79 | 81 | 80 | 84 | 83 |

NOTE.—Toluene diisocyanate/polyester molar ratio=2.0. Molecular weight of polyester=1,920. All samples stored 7 days before testing, except as indicated under Autographic S.S.

Table II
COMPLETE TABULATION OF DATA

| Run No | S281 | S283 | S284 | S286 | S288 | S289 | S291 | S299B | S313B | S313C | S314B | S314C | S327A | S327B | S327C | S328A | S328B | S328C |
|---|---|---|---|---|---|---|---|---|---|---|---|---|---|---|---|---|---|---|
| p,p'-Diaminodiphenylmethane/PDI [1] ratio | 0.5 | 0.8 | 0.9 | 1.0 | 0.7 | 0.6 | 0.5 | 0.5 | 0.5 | 0.5 | 0.7 | 0.7 | 0.7 | 0.7 | 0.7 | 0.5 | 0.5 | 0.5 |
| Cure: | | | | | | | | | | | | | | | | | | |
| Time, hrs | ½ | ½ | ½ | ½ | ½ | ½ | 16 | 1 | 2 | 8 | 2 | 8 | ½ | 2 | 8 | ½ | 2 | 8 |
| Temp., °C | 140 | 140 | 140 | 140 | 140 | 140 | 140 | 140 | 140 | 140 | 140 | 140 | 160 | 160 | 160 | 160 | 160 | 160 |
| Autographic S.S. (0 days): | | | | | | | | | | | | | | | | | | |
| 100% elong., p.s.i | | | | 780 | 645 | 460 | 225 | 325 | 435 | 545 | 675 | 595 | 575 | 590 | 540 | 400 | 425 | 550 |
| 200% elong., p.s.i | | | | 975 | 840 | 750 | 315 | 490 | 625 | 810 | 970 | 800 | 825 | 825 | 730 | 575 | 625 | 790 |
| 300% elong., p.s.i | | | | 1,200 | 930 | 1,075 | | 690 | 925 | 1,170 | 1,380 | 1,300 | 1,175 | 1,375 | 960 | 800 | 875 | 1,125 |
| Tensile, p.s.i | | | | 1,550 | 1,760 | 2,328 | 315 | 975 | 1,200 | 2,480 | 2,920 | 2,580 | 3,375 | 3,150 | 2,080 | 1,175 | 1,835 | 3,850 |
| Elong. at break, percent | | | | 445 | 435 | 555 | 205 | 400 | 430 | 560 | 560 | 560 | 630 | 680 | 690 | 580 | 550 | 670 |
| Autographic S.S. (7 days): | | | | | | | | | | | | | | | | | | |
| 100% elong., p.s.i | 665 | 625 | 750 | 715 | 700 | 650 | 590 | 550 | 640 | 605 | 680 | 650 | 660 | 590 | 510 | 600 | 575 | 560 |
| 200% elong., p.s.i | 950 | 920 | 960 | 905 | 950 | 900 | 850 | 775 | 950 | 910 | 980 | 900 | 925 | 825 | 675 | 865 | 860 | 790 |
| 300% elong., p.s.i | 1,465 | 1,240 | 1,250 | 1,000 | 1,330 | 1,300 | 1,325 | 1,125 | 1,360 | 1,460 | 1,435 | 1,300 | 1,300 | 1,150 | 1,300 | 1,160 | 1,175 |  |
| Tensile, p.s.i | 3,900 | 2,370 | 1,830 | 1,450 | 2,800 | 3,425 | 2,925 | 3,875 | 4,250 | 1,535 | 3,500 | 3,760 | 3,550 | 3,250 | 1,910 | 3,425 | 4,135 | 4,400 |
| Elong. at break, percent | 430 | 360 | 450 | 430 | 475 | 550 | 465 | 570 | 530 | 320 | 520 | 530 | 610 | 680 | 700 | 590 | 630 | 640 |
| Scott test: | | | | | | | | | | | | | | | | | | |
| Tensile, p.s.i | 5,000 | 2,140 | 1,810 | 1,120 | 2,740 | 3,590 | 4,400 | 4,720 | 4,700 | 4,610 | 3,930 | 3,210 | 3,780 | 3,530 | 1,740 | 5,400 | 5,200 | 5,760 |
| Elong., percent | 710 | 670 | 640 | 560 | 710 | 740 | 690 | 750 | 720 | 600 | 600 | 690 | 650 | 700 | 780 | 680 | 740 | 770 |
| Set | 0.22 | 0.33 | 0.39 | 0.37 | 0.29 | 0.25 | 0.10 | 0.21 | 0.24 | 0.25 | 0.29 | 0.42 | 0.34 | 0.43 | 0.97 | 0.25 | 0.33 | 0.30 |
| Tors. hyst. at— | | | | | | | | | | | | | | | | | | |
| R.T. | .181 | .186 | .154 | .222 | .213 | .204 | .175 | .177 | .152 | .158 | .156 | .147 | .166 | .204 | .259 | .158 | .167 | .183 |
| 280° F. | | | | | | | .099 | .084 | .085 | .064 | .080 | .084 | .086 | .124 | .127 | .080 | .083 | .094 |
| Tear Test, lb./.1 inch | 18 | 36 | 38 | 38 | 25 | 25 | 21 | 23 | 22 | 30 | 34 | 37 | 36 | 39 | 23 | 22 | 30 | 26 |
| Swelling index in DMF [2] | 5.5 | 14.0 | 34.0 | ∞ | 11.6 | 6.2 | 8.4 | 10.4 | 6.3 | 12.1 | 6.1 | 37.8 | 2.5 | ∞ | ∞ | 10.3 | 20.4 | 39.0 |
| Percent dissolved in DMF | 0.5 | 52 | 76 | 100 | 33 | 0 | 6 | 20 | 0 | 22 | 10 | 68 | 54 | 100 | 100 | 12 | 26 | 41 |
| Durometer | 80 | 81 | 80 | 82 | 81 | 80 | | | | | | | 79 | 78 | 77 | 79 | 78 | 78 |

[1] PDI is polyester-diphenylmethane diisocyanate. [2] DMF is dimethylformamide.

NOTE.—Diphenylmethane diisocyanate/polyester molar ratio=2.0. Molecular weight of polyester=1,860. All samples stored 7 days before testing, except as noted under Autographic S.S.

EXAMPLE IX 15.98 parts by weight of polyester-diisocyanate adduct (same as that employed in Example VIII) were charged to a vessel at room temperature and 1.40 parts of dianisidine added with agitation. After 12 minutes, the material was pasty but easily workable. Part of this batch was placed in a mold and the rest heated to cause reduction of viscosity and poured into another mold. Both samples were cured for 20 minutes at 140° C. Both samples were smooth and clear after cure, each having an average Shore A durometer hardness of about 67. Toluene diisocyanate and dianisidine were reacted in boiling methylene chloride in semi molar concentration. Turbidity did not occur within 30 seconds.

EXAMPLE X 1.38 parts by weight of o-tolidine (M.P. 129° C.) were mixed with 18.11 parts of polyester-diisocyanate adduct (same as that employed in Example VIII) at room temperature. After 6 minutes, part of the mixture was allowed to flow under its own weight into a flat frame mold. The remainder of the material was warmed slowly to cause a thinning of the solution and then was poured, before becoming completely clear and homogeneous, into a mold. Both samples were allowed to stand in the cold molds for five minutes and then cured for 25 minutes at 140° C. The resultant samples were smooth and free of striations with Shore A durometer hardnesses of 69.

EXAMPLE XI 1.38 parts of o-tolidine were charged all at once into 18.15 parts of polyester-diisocyanate adduct (same as that employed in Example VIII) pre-heated to 129° C. Gel was visible in 15 seconds and the material had to be scraped into a mold at 20–30 seconds and was immediately cured for 25 minutes at 140° C. The resultant product had rough surfaces, striations and sticky spots throughout. The Shore A durometer readings at different points of the sample varied from a low of 28 to a high of 78.

EXAMPLE XII

To show the applicability of a typical polyether composition, 1.55 parts of 3,3'-dichloro-4,4'-diaminodiphenylmethane were charged to 15.37 parts of polyetherdiisocyanate adduct of (1 mole of polytetramethylene glycol of 900 molecular weight reacted with 1½ moles of toluene diisocyanate) at 30° C. and mixed for five minutes and the material remained fluid. The reactor vessel was placed in a 70° C. air oven and observed as follows:

| Time elapsed, min. | Mix temperature, °C. | Condition |
|---|---|---|
| 7 | 50 | Perfectly fluid. |
| 10 | 60 | Do. |
| 13 | 62 | Do. |

After a total pot time of 20 minutes, part of the sample was easily poured into a mold and the remainder easily poured into another mold 10 minutes later. Both samples were then cured for 45 minutes at 290° F. and both gave satisfactory products with Shore A durometer hardnesses of 75 and 77 respectively.

EXAMPLE XIII 20.55 parts by weight of the same adduct as in Example XII were heated to 100° C., at which temperature 3,3' dichloro-4,4'-diaminodiphenylmethane must conventionally be added, and 2.05 parts thereof were charged. External heating was removed to give as long a pot life as possible. Agitation continued.

At the end of 3 minutes, reaction temperature was 114° C. and a sample was taken and found to be flowable. After 6 minutes another sample was taken and found to be much thicker but still flowable. After 9 minutes, the mixture had completely gelled and would not flow at all. The early sample after cure at 290° F. for 45 minutes gave a Shore A durometer hardness reading between 65 and 69. The later sample gave a reading of 77. The final mixture having already gelled was not moldable.

It will be appreciated that the invention contemplates the employment of any conventional liquid polyurethane prepolymer of the kind referred to above, as illustrated in the working examples. Detailed descriptions of the conventional polyurethane prepolymer system will be found in numerous patents and in the literature, or in copending application Serial No. 693,531 of Dosmann et al., filed October 31, 1957, the disclosure of which is hereby incorporated in the present specification by reference, as representative of the prepolymers employed in the present invention. In general, it may be stated that the liquid polyurethane prepolymer employed in this invention is a reaction product of an organic polyisocyanate (typically a diisocyanate, although small amounts of a triisocyanate may also be used along with the diisocyanate) with a polyfunctional material. By way of non-limiting example, it may be mentioned purely for purposes of illustration that suitable polyisocyanates include polymethylene diisocyanates such as ethylene diisocyanate, hexamethylene diisocyanate and tetramethylene diisocyanate; alkylene diisocyanates such as propylene-1,2-diisocyanate; cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-diphenylmethane diisocyanate and phenylene diisocyanate

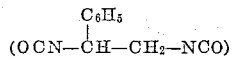

butane - 1,2,2-triisocyanate; triphenylmethane-4,4',4''-triisocyanate; and polyisocyanates derived from corresponding substituted hydrocarbon radicals, such as monochlorobenzene-2,4,6-triisocyanate.

The polyfunctional material with which the foregoing or any other suitable diisocyanate is reacted to form the liquid prepolymer typically contains terminal hydroxyl groups and ordinarily has a molecular weight falling within the range of from about 300 to about 5000. Perhaps most frequently, such material may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5000, and preferably from about 1500 to about 3000. In general the most suitable polyesters are chiefly linear in type with melting point levels of 90° C. or lower. Examples include polyethylene adipate, polyethylene adipate-phthalate, polyneopentyl sebacate, as well as esters of such diols as propylene glycol; 1,3-propane diol; 1,4-butane-diol, diethylene glycol and dipropylene glycol with such acids as succinic acid, glutaric acid, pimelic acid, suberic acid, azelaic acid, etc.

If desired, small amounts of tri-alcohols such as trimethylolpropane or trimethylolethane may be included in the preparation of the glycol-dicarboxylic acid polyester, and such modified forms of polyester are included within such terms as "polyester," or "glycol-dicarboxylic acid polyester" as used herein, that is when we describe the polyesters as reaction products of glycols with dicarboxylic acids, we do not intend to exclude the possibility that a small amount of a triol is also used.

As an alternative to the polyesters just described there may be used (for reaction with the diisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may usually range from 500 to 5,000 (i.e., hydroxyl number of about 225 to 22), but is preferably within the range of 750 to 3,500 (i.e., hydroxyl number of about 150 to 45). Preferred polyethers may be represented by the formula $H(OR)_nOH$ where R is a lower (2-6 carbon atoms) alkylene group and $n$ is an integer such that the molecular weight falls within the range specified.

Polyethers not only can be used in place of polyesters, but can be used in conjunction with the polyesters either as an added reagent or as an intimate part of the polyester molecule in the form of a poly-ether-ester. Examples of such poly-ether-esters are poly diethylene glycol adipate and poly triethylene glycol adipate.

Further examples of polyesters or polyethers suitable for forming prepolymers useful in the invention are the polyesters and polyethers mentioned in U.S. Patents 2,606,162, Coffey, August 5, 1952; 2,801,990, Seeger, August 6, 1958; 2,801,648, Anderson, August 6, 1957; and 2,814,606, Stilmar, November 26, 1957. It is desired to emphasize that the invention contemplates the use of any and all such known polyethers or polyesters (including poly-ether-esters) suitable for reaction with a diisocyanate to yield a polyurethane prepolymer capable of being cured to an elastic state by the action of a diamine.

In preparing the prepolymer, the polyester or polyether (including poly-ether-ester) is, as is too well known to require detailed elaboration here, reacted with a diisocyanate, using a considerable molar excess, commonly from a 20% to a 250% and preferably from a 50% to a 150% molar excess, of the diisocyanate over that amount which would be required to react with all of the alcoholic groups furnished by the polyester. The reaction is frequently effected by mixing the polyester or the like and the diisocyanate under anhydrous conditions at room temperature, or at a moderately elevated temperature, e.g. 70–150° C., to form a soluble (in methyl ethyl ketone), uncured, liquid prepolymer which is polyurethane having terminal isocyanate groups. Any such conventional prepolymers may be substituted in the above examples with generally equivalent results.

It will be apparent from the above description that the invention possesses manifold advantages. By mixing the primary diamine with the prepolymer while the diamine is in crystalline form, and by maintaining the diamine in such form in the mixture by keeping the temperature of the mixture below the melting point of the diamine, it has been found, as pointed out, that an unusually stable mixture having ample pot life is obtained. As indicated, the unique curable mixture of the invention is a liquid or paste-like two-phase system, in which the liquid prepolymer is a continuous phase and the diamine in crytalline form is a dispersed phase.

It is desired to emphasize that the unusual stability and relatively long pot life of the present mix are definitely associated with this essential two-phase character of the mix. Apparently, as long as the diamine curative remains in the form of a separate dispersed phase, its rate of reaction with the prepolymer is quite slow; even though the diamine is inherently rapidly reactive with the prepolymer at the very same temperatures at which the present mix remains uncured for a substantial period of time. In this connection particular attention is directed to Example VI above, in which the diamine was added at room temperature, but in non-crystalline (dissolved) form, with the result that the pot life was extremely brief, and the advantages of the invention were not obtained. Therefore, it will be apparent that by adding the diamine in crystalline form and maintaining the great bulk of its essentially in such form (by maintaining the temperature below the melting point of the diamine) a new result is obtained in the form of greatly increased pot life, that allows more than ample time for such shaping operations as casting, injecting, coating or impregnating (e.g., spreading, spraying, or dipping). Textile fabric, paper, or various other sheet materials or surfaces may have the liquid or paste-like material of the invention applied in a convenient and efficient manner, without necessity for undue haste and without undue risk that the material will "set-up" or cure prematurely, before the shaping operation can be completed satisfactorily. By employing the invention, batches of shapable material of reasonable size can easily be prepared and used up without waste or spoilage.

At the same time, the invention takes full advantage of the inherently rapid curing action of the primary diamines, since in order to achieve a rapid cure once the mixture is shaped, it is necessary only to heat the mixture to a temperature sufficient to destroy the crystalline form of the diamine, that is, it is necessary only to heat the mixture to a temperature in excess of the melting point of the primary diamine, whereupon the desired rapid cure takes place. Here, again, it is desired to emphasize that what is essentially involved is not a mere change in reaction rate consequent to a change in temperature, but rather the significant and controlling factor is the change in the physical state or disposition of the primary diamine in the prepolymer. Once the diamine leaves its dispered condition and becomes dissolved or definitely one phase with the prepolymer, the cure cannot be arrested or halted merely by lowering the temperature. It is not believed that it has heretofore been known, in the art of curing liquid polyurethane prepolymers with primary diamines, to thus postpone the rapid curing action of the diamine by maintaining it as a disperse phase until such time as it is desired to effect rapid cure.

It is desired to point out that in some cases the shaping step may be carried out simultaneously with or virtually simultaneously with the conversion of the two-phase system into essentially a single phase system. Thus for example, the initially prepared two-phase mixture of crystalline primary diamine and prepolymer may be poured into a preheated mold (heated to a temperature in excess of the melting point of the diamine), so that virtually as soon as the mixture takes the shape of the mold it has already begun to be heated, the diamine has begun to dissolve, and the mixture is simultaneously losing its two phase nature, while the cure has also begun to advance rapidly. However, even with such procedure it will be recognized that two distinct stages take place in the method of the invention: in the first stage (before the shaping operation) the mixture is essentially two-phase and the diamine is undissolved, and there is no tendency to cure rapidly; in the second stage (after the mixture has the desired shape) the diamine is dissolved, the system is essentially single phase, and it tends to cure rapidly.

It will be understood that the expression "shaping operation" is used in this specification and in the appended claims in its usual meaning, to refer to any conventional method of imparting a definite, desired useful configuration or form to the curable, solidifiable liquid polyurethane polymer, such as molding (including casting), spreading, dipping, or the like. The word "shaped" has reference to the fact that the object resulting from such shaping operation has a definite outline or configuration. The word "shape" of course refers to the form or figure of an object.

Having thus described our invention, what we claim and desire to protect by Letters Patent is:

A method of making a solid object having a definite, desired shape from a polyurethane elastomer comprising in combination the steps of providing a liquid, isocyanate-terminated, uncured polyurethane prepolymer which is a reaction product of (A) poly(ethylene/propylene) adipate having a hydroxyl number of from 20 to 225, an acid value less than 6, and a molecular weight of from 500 to 5,000 with (B) a 20 to 250% molar excess, based on the weight of (A), of diphenylmethane diisocyanate, mixing the said liquid polyurethane with crystalline p,p'-diaminodiphenylmethane at room temperature to disperse the crystalline p,p-diaminodiphenylmethane uniformly throughout the liquid prepolymer to form a two-phase system in which the liquid prepolymer is a continuous phase and the crystalline p,p'-diaminodiphenylmethane is a solid dispersed phase, the said two-phase system being characterized by the ability to remain in an uncured, workable, liquid condition while a desired shaping operation is performed, thereafter performing a shaping operation while maintaining the crystalline p,p'-diaminodiphenylmethane in the dispersed condition in said two-phase, liquid system, and subsequently heating the mixture in the desired shape to a temperature of from 140° to 160° C., to convert the said two-phase, liquid system into a single phase, whereby the mixture thereupon cures rapidly to a solid, elastomeric object of the desired shape.

References Cited in the file of this patent

UNITED STATES PATENTS

| | | |
|---|---|---|
| 2,620,516 | Muller | Dec. 9, 1952 |
| 2,773,048 | Formo et al. | Dec. 4, 1956 |
| 2,778,810 | Muller et al. | Jan. 22, 1957 |
| 2,858,298 | Burt | Oct. 28, 1958 |

FOREIGN PATENTS

| | | |
|---|---|---|
| 733,624 | Great Britain | July 13, 1955 |
| 790,543 | Great Britain | Feb. 12, 1958 |